(No Model.)
A. S. GLOVER.
SEWAGE APPARATUS.
No. 559,522. Patented May 5, 1896.
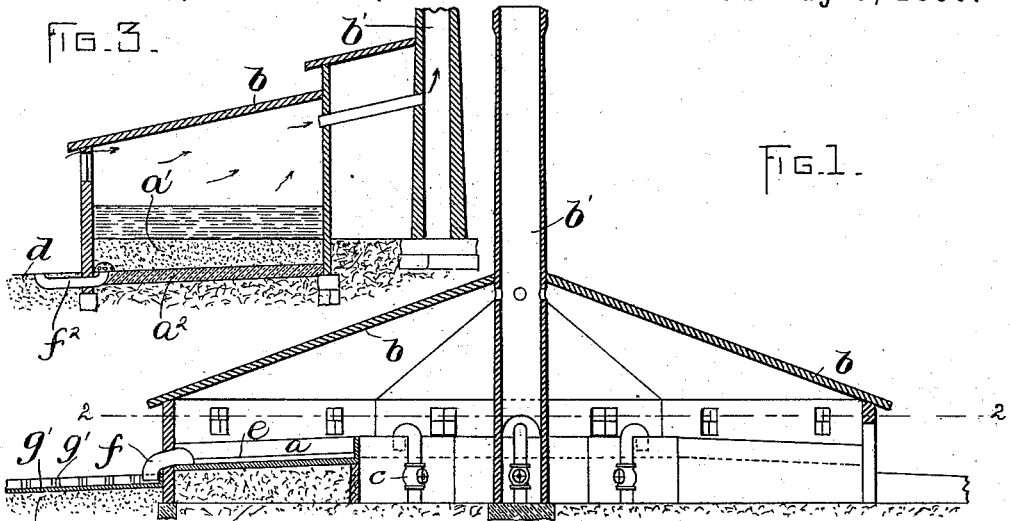
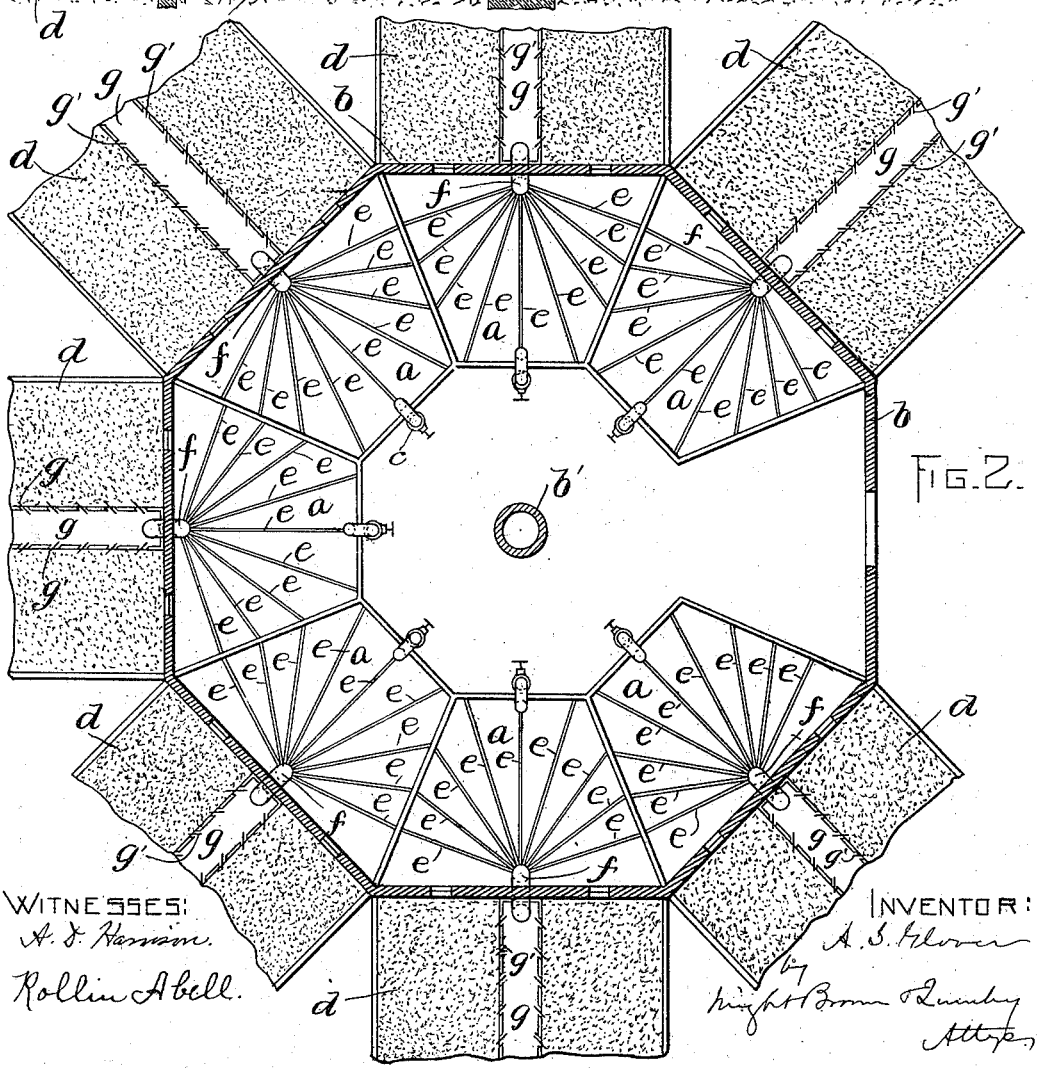
WITNESSES:
A. J. Harrison
Rollin Abell
INVENTOR:
A. S. Glover
by Wight Brown & Quinby
Attys

UNITED STATES PATENT OFFICE.

AMASA S. GLOVER, OF BROCKTON, MASSACHUSETTS.

SEWAGE APPARATUS.

SPECIFICATION forming part of Letters Patent No. 559,522, dated May 5, 1896.

Application filed September 23, 1895. Serial No. 563,340. (No model.)

*To all whom it may concern:*

Be it known that I, AMASA S. GLOVER, of Brockton, in the county of Plymouth and State of Massachusetts, have invented certain new and useful Improvements in Sewage Apparatus, of which the following is a specification.

This invention has for its object to permit the filtration of sewage on a large scale without making the same offensive; and it consists in an apparatus comprising a series of primary filter-beds and means for charging the same with sewage, a structure inclosing said primary beds and having provision for the removal of the gases emanating therefrom, the said primary beds being constructed to separate the solid from the liquid matter and to discharge the effluent wholly through filtering material, and a series of secondary filter-beds located outside the said structure and arranged to receive said effluent by gravitation and adapted to complete the purification of the same, the effluent being clarified and sufficiently purified and deprived of offensive matter by the primary filter-beds to permit its treatment by the secondary beds in the open air without offense.

Of the accompanying drawings, forming a part of this specification, Figure 1 represents a vertical section of one form of sewage apparatus embodying my invention. Fig. 2 represents a section on line 2 2 of Fig. 1 and a plan of the parts below said line. Fig. 3 represents a vertical section of another form of apparatus.

The same letters of reference indicate the same parts in all the figures.

In the drawings, $a\ a\ a$ represent a series of primary filter-beds, which are inclosed in a structure having provision, such as a chimney $b'$, for the removal of gases emanating from the filter-beds $a$.

The sewage may be first deposited in a settling-tank, which may be within the structure $b$ or elsewhere, and after sedimentation or chemical precipitation in said tank the liquid and the sludge may be drawn off onto the primary filter-beds.

I have not shown the settling-tank in the drawings; but it may be supposed to be below the floor of the structure $b$ and connected with pipe $c$, through which the sewage may be transferred to the primary filter-beds.

$d\ d\ d$ represent a series of secondary filter-beds located at the outer ends of the primary beds and at a lower level, so that the effluent from the primary beds will flow by gravitation upon the secondary beds.

The primary beds are constructed to arrest the solid matter and permit the escape of the liquid matter wholly through filtering material onto the secondary beds, so that the effluent will contain comparatively little offensive matter. The primary beds may be of any suitable construction to accomplish this end. For example, they may have water-tight bottoms of concrete and a series of porous pipes $e$, disposed upon the said bottoms and converging to an outlet-pipe $f$, as shown in Figs. 1 and 2, the walls of said pipes $e$ constituting the filtering material. The pipes $e$ have no direct communication with the spaces inclosed by the walls of the primary beds and the effluent enters said pipes only through the porous wall of the pipes, which may be of unglazed earthenware.

In Fig. 3 I show primary filter-beds $a'$, composed of filtering material, such as sand and gravel or any of the materials used for such purposes, resting on a liquid-tight concrete bottom $a^3$. An outlet-pipe $f^2$ communicates with the filter-bed and receives the effluent therefrom and delivers it to the corresponding secondary bed.

The secondary beds are located outside of the structure $b$ and may be of any desired size and construction. They are here shown as provided with sluices or passages $g$, which receive the effluent from the outlet-pipes $f$ and have lateral outlets $g'$, through which the effluent passes in numerous small streams to filtering-surfaces.

It will be seen that the sewage matter is separated in the primary beds into two parts, the offensive matter being retained in the gas-removing structure, where it may be composted with ashes, loam, or sand and removed without offense, while the effluent is clarified and partially purified by being deprived of the greater part of the offensive matter, so that it may be rapidly disposed of in the open air by the secondary beds without being a source of offense. The secondary bed should be of much larger area than the primary beds, so that they can dispose of all the effluent that can possibly flow from the primary beds.

The fact that the secondary beds are much larger than the primary beds is indicated in the drawings, in which the outer ends of the secondary beds are shown as broken away, this being due to the limitations imposed by the size of the drawing-sheet.

I prefer to provide seven or more of the primary beds and an equal number of secondary beds, each primary bed and the accompanying secondary bed being of sufficient capacity to dispose of one day's sewage. The solid matter deposited in the primary beds may be removed from time to time in any suitable way.

It is to be understood that in practice the outer ends of the sluices $g$ are closed or of such height that the effluent can escape therefrom only through the outlets $g'$ to the beds $d\ d$.

The general construction of the entire apparatus is such that while the primary filtration takes place in a structure adapted to remove offensive gases the secondary treatment, being in the open air, may extend for such length of time or over such an area of secondary beds as to completely dispose of the sewage.

I claim—

A sewage apparatus comprising a series of stationary primary filter-beds, a structure over said beds with provision for the removal of offensive gases therefrom, and a series of stationary secondary filter-beds located outside the said structure and arranged to receive by gravitation the effluent from the primary filter-beds, the said primary beds being constructed to discharge the effluent wholly through filtering material, whereby the offensive matter is retained in the structure and the effluent is clarified and partially purified, and whereby the said effluent may receive subsequent treatment in the open air by extensive secondary beds for any required length of time without offense.

In testimony whereof I have signed my name to this specification, in the presence of two subscribing witnesses, this 20th day of September, A. D. 1895.

AMASA S. GLOVER.

Witnesses:
ARTHUR P. HAZARD,
CHAS. C. KEITH.